United States Patent
Gerber

(10) Patent No.: US 7,610,512 B2
(45) Date of Patent: Oct. 27, 2009

(54) SYSTEM AND METHOD FOR AUTOMATED AND ASSISTED RESOLUTION OF IT INCIDENTS

(75) Inventor: Jeff Gerber, Kirkland, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 520 days.

(21) Appl. No.: 11/327,745

(22) Filed: Jan. 6, 2006

(65) Prior Publication Data

US 2007/0174693 A1    Jul. 26, 2007

(51) Int. Cl.
*G06F 11/00* (2006.01)
(52) U.S. Cl. .............................. 714/26; 714/25; 714/46; 717/124; 717/125; 717/126
(58) Field of Classification Search .................. 714/25, 714/26, 46; 717/124–126
See application file for complete search history.

(56) References Cited

U.S. PATENT DOCUMENTS

| | | | |
|---|---|---|---|
| 6,029,258 A * | 2/2000 | Ahmad | 714/46 |
| 6,032,184 A * | 2/2000 | Cogger et al. | 709/223 |
| 6,742,141 B1 * | 5/2004 | Miller | 714/26 |
| 6,941,291 B1 * | 9/2005 | Zoller et al. | 707/1 |
| 7,096,355 B1 * | 8/2006 | Marvit et al. | 713/162 |
| 7,225,139 B1 * | 5/2007 | Tidwell et al. | 705/8 |
| 2002/0133561 A1 * | 9/2002 | O'Brien et al. | 709/213 |
| 2002/0156664 A1 * | 10/2002 | Willcox et al. | 705/7 |
| 2003/0171877 A1 * | 9/2003 | Adedeji et al. | 702/27 |
| 2004/0025077 A1 * | 2/2004 | Salem | 714/2 |
| 2004/0153823 A1 * | 8/2004 | Ansari | 714/38 |
| 2004/0230328 A1 * | 11/2004 | Armstrong et al. | 700/83 |
| 2005/0015678 A1 * | 1/2005 | Miller | 714/38 |
| 2005/0081079 A1 * | 4/2005 | Cheston et al. | 714/2 |
| 2005/0081118 A1 * | 4/2005 | Cheston et al. | 714/47 |
| 2006/0248407 A1 * | 11/2006 | Adams et al. | 714/43 |

* cited by examiner

*Primary Examiner*—Scott T Baderman
*Assistant Examiner*—Chae Ko

(57) ABSTRACT

A computer implemented method for assisted and automated resolving of Information Technology (IT) incidents is provided. The method facilitates one or more users to define repair workflows to resolve the IT incidents. The defined repair workflows are stored in a flow repository. The stored repair workflows are accessed and invoked by the one or more users. The invoked repair workflows are interactively executed for a user assisted resolution of the IT incident. The invoked repair workflows are executed automatically for the automated resolution of the IT incident.

7 Claims, 20 Drawing Sheets

Repair System Central

Dashboard | Repairs | Reports | Administration

Search the Repair System for:

Welcome, bwhite. Not you? | Logout

Simple Repair: Repair IIS Server

Description: This flow does a basic health check on an IIS server including connectivity checks and attempts a repair if a problem is detected. It is integrated with ticketing and also supresses alerts which are no longer relevant after the repair is complete. Symptoms: If an IIS server or application which depends on an IIS server is having problems, this flow performs basic triage and resets IIS if necessary. Keywords: web server, IIS 100 % completed in 00m:29s

[Restart] [View Report]  ← 714

The wizard is a fast and simple interface for running a repair. Limited details are shown, and only essential input is required.

The summary of results

It is easy to see from this history that a ticket has been opened and IIS has been reset successfully You can view all steps in the full report for the individual repair after it completes running.

Results

| Step | Results | Description |
|---|---|---|
| Get IIS Server To Check | success | Performing check on server localhost |
| Check Connectivity | success | No connectivity problems detected on server localhost |
| Check IIS Server Health | unhealthy | |
| Check IIS Status | errors | |
| Error : unhealthy | unhealthy | > Repair IIS Server > Check IIS Server Health |
| Open Ticket | opened | Return step - Check IIS Server Health<br>Ticket BL6-0322 has been opened. |
| Reset IIS | reset ok | IIS Reset on server localhost was successful |
| Update Alerts | updated | All IIS related alerts generated in the last 30 minutes on server localhost have been resolved. |
| Close Ticket | closed | Closed ticket BL6-0322 and attached repair history details |
| Resolved : repaired | repaired | Return step - Repair IIS Server | iConclude
Local intranet
Done

Reports

Summary of all repairs grouped by name /904

| Repair Name | Number of Runs | Avg Num Steps | Avg Time To Repair [s] | Most Recent Run | Percent Resolved | Percent Diagnosed | Percent Error | Percent No Action | Percent Failed | Operation |
|---|---|---|---|---|---|---|---|---|---|---|
| Exchange Health Check | 8513 | 0.0 | 88.368 | 2005-10-15 10:46:20.0 | 7.00% | 30.00% | 17.10% | 26.20% | 18.80% | /Library/Exchange Rep. Pack/ExchangeHealth |
| Message Queue Alert Check | 7411 | 0.0 | 8.936 | 2005-10-15 10:46:20.0 | 22.50% | 29.60% | 23.10% | 15.50% | 9.30% | /Library/Queues/AlertC |
| IIS Reset | 5955 | 0.0 | 4.683 | 2005-10-16 10:46:28.0 | 26.40% | 18.76% | 26.50% | 19.50% | 8.90% | /Library/IIS/IIS Reset |
| Repair IIS Server | 8 | 7.5 | 27.104 | 2005-10-20 18:33.0 | 100.00% | .00% | .00% | .00% | .00% | /Library/My Flows/Repe |
| Web | 44 | 16.0 | 10.767 | 2005-10-19 15:11:10.0 | 100.00% | .00% | .00% | .00% | .00% | /Library/Web Server R Repair |
| | | 16.0 | 12.894 | 2005-10-19 15:16:16.0 | 100.00% | .00% | .00% | .00% | .00% | /Library/application_he Application Health |
| | | 6.0 | 25.229 | 2005-10-18 16:04:21.0 | 100.00% | .00% | .00% | .00% | .00% | /Library/tests/Tv3 its t Reset |

Because a long-running repair center can have many thousands of individual repairs run in a very short time, the reporting structure can accommodate this vast store of historical data.

To quickly access your needed information, start from the top, and drill down to the level you need.

To start over, click the New Search button.

Reporting Level
All Repair Types

Export Options

Here you can see for each repair, the number of times it has been run, average time to repair, and % success.

It is also possible to drill down into each run to look at key data like which IIS servers are being reset.

FIG. 9b

SYSTEM AND METHOD FOR AUTOMATED AND ASSISTED RESOLUTION OF IT INCIDENTS

BACKGROUND

The present invention, in general relates to support of Information Technology (IT) infrastructure. More specifically, it relates to managing and resolving IT incidents related to the IT infrastructure.

An IT incident is an event that is apparent and typically results in an interruption or a reduction in the performance of enterprise applications, hardware or network. IT incidents are often the result of failures or errors in the applications, electronic devices, or network infrastructure. Examples of IT incidents are exceeding disk-usage threshold, web page not displaying, application performing below performance thresholds, printer not printing, forgotten password, and so forth. These and similar IT incidents are often reported to an IT service desk. The IT service desk very often is a central point where IT incidents are reported and service requests are made. The IT service desk typically keeps users informed about the IT incidents, actions, and opportunities that affect the users.

According to conventional methods, the IT incidents are typically referred to the IT staff and handled manually by the IT staff with assistance from documentation, knowledge bases, and scripts. The IT staff typically comprises a team of dedicated technical professionals. The documentation, knowledge bases, and scripts also need to be manually updated periodically as new IT incidents keep occurring. However, as a result of IT infrastructure complexity and a need to reduce IT failures, automation of IT incident management is required. The ability to identify the root cause of IT failures, document solutions, and automate the problem-resolution processes can enhance the performance of the IT infrastructure.

Currently, the need for automation is partially fulfilled using methods that utilize IT service desk software. Existing IT service desk software for IT incident handling provides interfaces for maintaining a log of IT incidents and solutions for those IT incidents. Other software includes monitoring software that keeps a track of network infrastructural devices and raises alarm in case of an error. The monitoring software may contain limited scripts to diagnose errors. Manual intervention is often required while using monitoring software, to resolve the IT incidents.

BRIEF DESCRIPTION OF THE DRAWINGS

Embodiments of the invention will hereinafter be described in conjunction with the appended drawings provided to illustrate and not to limit the invention, wherein like designations denote like elements, and in which:

FIG. 9 illustrates views of a report and history interface for a repair history and reporting module, in accordance with an embodiment of the present invention;

DESCRIPTION OF ILLUSTRATIVE EMBODIMENTS

The method and system described hereby facilitates resolution of Information Technology (IT) incidents. An IT incident is an event that is apparent and typically results in an interruption or a reduction in the performance of an enterprise application, network or infrastructure device. The present invention facilitates resolution of IT incidents by creating repair workflows, storing the repair workflows in a repair workflow repository, and/or subsequently, executing the repair workflows in the repair workflow repository.

Figure 1:
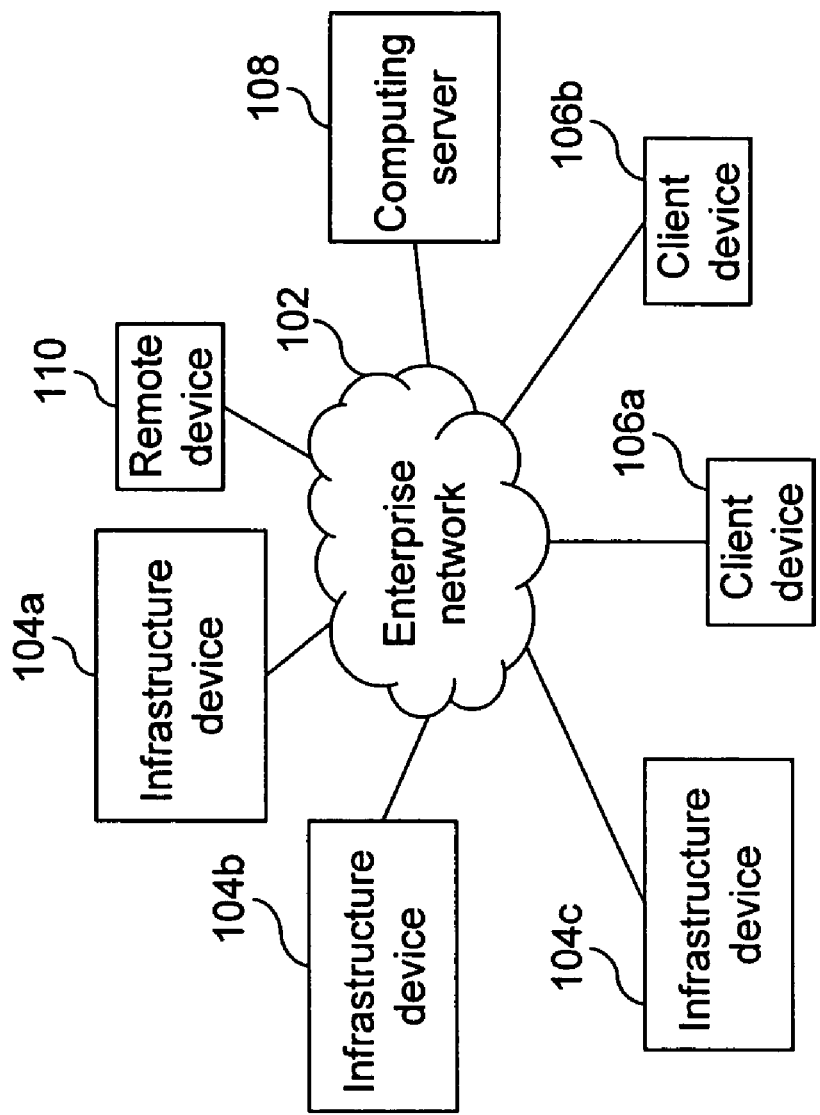
FIG. 1 is a block diagram of an operational environment for various embodiments of the invention.

FIG. 1 is a block diagram of an operational environment 100 for various embodiments of the present invention. Environment 100 includes an enterprise network 102, infrastructure devices 104, client devices 106, a computing server 108, and a remote device 110. Enterprise network 102 selectively interconnects geographically distributed infrastructure devices, such as, an infrastructure device 104a, an infrastructure device 104b, and an infrastructure device 104c to each other. Enterprise network 102 also selectively interconnects client devices 106, such as, a client device 106a and a client device 106b, computing server 108, and remote device 110.

Enterprise network 102 is a network of infrastructure devices 104a, 104b, and 104c connected to each other for integrating and managing business related activities in an organization. Examples of enterprise network 102 include, but are not limited to, manufacturing and material handling networks, Customer Relationship Management (CRM) networks, banking and accounting networks, telecommunication networks, data storage networks, IT organizations and so forth. Infrastructure devices 104 are facilities and resources required for managing business-related activities. Examples of infrastructure devices 104 include, but are not limited to, workstations, printers, machines, servers, telephony devices, data storage systems, control panels, and so forth. Client devices 106, computing server 108, and remote device 110 may be required to handle information that flows across infrastructure devices 104 and to maintain these devices.

Client devices 106 may perform various tasks such as configuring infrastructure devices 104, upgrading these devices, recording performance of enterprise network 102, and so forth. Computing server 108 may provide resources that are required to implement these tasks, to client devices

106. In an embodiment of the present invention, computing server 108 may provide a collection of methodology to perform the tasks. Remote device 110 may be required to share load of computing server 108 and provide services to client devices 106 that are geographically distributed.

In an embodiment of the present invention, the tasks include resolution of IT incidents. The resolution of IT incidents is achieved by executing repair workflows stored in computing server 108. The repair workflows are sets of instructions used by client devices 106 to resolve IT incidents in enterprise network 102.

The terminology related to the present invention has been described below. An effort is made throughout this application to adhere to the following term definitions as consistently as possible.

Terminology

Repair workflow: A repair workflow is a set of instructions used by the system to resolve incidents. The repair workflow is constructed from steps, operations and transitions.

Repair Run: An execution of a repair workflow.

Run Context: A set of key-value pairs containing data values discovered during a repair run can be pushed into a run context. The subsequent steps of the repair run use the data values stored in the run context. For example, a repair run might discover the location of a user's home directory and put that value in the run context under the key: USER_HO-ME_DIR.

Operation: An operation is a unit of work to be performed in context of a repair workflow. Operations can represent manual tasks or automated actions that can also be performed by a person. These include, but are not limited to command line actions, running scripts, gathering information from web pages, or querying the user for input. Operations can also be other repair workflows. Therefore, repairs can contain nested workflows that allow greater reuse of repair content. Operations contain inputs, results, and responses. Inputs define the necessary information required to perform a task. For example, in a ping operation, the input would be the hostname who is pinged. Results are the information produced by executing the task. The ping operation produces a latency report that shows the connectivity information to the host specified in the input. Responses define a finite set of possible outcomes from the execution of the operation. Steps and transitions use responses to link operations together in a repair workflow. For a simple ping operation the responses would be HOST_AVAILABLE and HOST_NOT_AVAILABLE.

Steps: A step is an invocation of an operation in the context of a repair workflow. The step has a reference to the operation that it invokes. The step defines how the inputs of the operation are supplied data values at the time of repair matching of each input with a binding.

Bindings: Bindings define a mapping of data values to the inputs of an operation in the context of a step within a repair workflow. Various types of bindings exist, with each having a unique method of supplying values to operation inputs. Table 1 below illustrates some types of bindings, in accordance with embodiments of the present invention.

TABLE 1

| Binding Type | Description |
| --- | --- |
| Static Binding | Assigns hard-coded values to operation inputs |
| User Input Binding | Prompts the user for input. The binding instructs the user interface to present interface elements to |

TABLE 1-continued

| Binding Type | Description |
| --- | --- |
|  | the user to gather the input, including text fields, pick-lists and textual prompts. |
| Context Binding | Assigns values from the run context to operation inputs |
| File Binding | Assigns values from the contents of flat files to operation inputs |
| LDAP/Active Directory Binding | Assigns values from directory services like ActiveDirectory to operations inputs |
| SQL Binding | Assigns values from database query results to operation inputs. This enables binding Inputs to other systems of management infrastructure like Configuration Management Databases (CMDB). |

Subflow: If a step of a primary repair workflow refers to an operation which is a repair workflow, the repair workflow is considered a subflow of the primary repair workflow.

Repair Frame: A frame of execution in a repair is referred to as repair frame. Each repair workflow is assigned a repair frame during execution. A frame stack is created during repair execution. Repairs which contain subflows will have a frame for each subflow. During execution, the flow of control will 'step into' and 'step out' of frames as repair steps are executed.

Start Step: This is the starting point for the repair. Each flow must define one and only one start step.

Critical Step: A critical step is a step which performs some critical operation in a repair such as rebooting a server or restoring a database. Users are prompted before executing these steps to cancel or confirm the desire to continue with the repair.

Return Steps: Each repair workflow must define at least one return step. There are four types of return steps indicating the status of the repair after the repair workflow has been executed. These are illustrated in Table 2, as shown below.

TABLE 2

| Return StepType | Description |
| --- | --- |
| RESOLVED | Indicates the resolving of the incident |
| DIAGNOSED | Indicates the incident has been diagnosed but not resolved |
| NO ACTION TAKEN | Indicates the end of repair workflow with no action taken for resolution of incident. The incident may not have been a problem or the problem may not have been diagnosed or resolved |
| ERROR | The flow ends with some error. The repair content or the configuration of the repair system may be incorrect |

Return steps also have a response. When a flow executes, the flow of control will eventually come to a return step. The response of the return step is used as the response for the flow. If the flow is a subflow, the calling flow will have a step that links to it and a set of transitions linked up to the responses of the subflow. The response of the return step is used by the calling flow's step to select the transition to go to the next step.

Transitions: A transition links various steps together. The transition has a source step and a destination step and a link to an operation response called the 'transition trigger'. A step has only one transition for each response that is defined by its operation. After a step executes its operation at repair time, the response is used to select the transition to go to the next step. A Return On Investment (ROI) metric may be attached to a transition. This enables repair system ROI tracking by summing the transition ROI metric for historical executions of repair workflows.

Gated Transition: A gated transition requires the user to have sufficient access privileges to cross the transition and go to the next step. If the user does not have access privileges, the run is paused and is handed off to another user with the required privileges, to continue.

Automated Repair: A repair workflow can be initiated and run without human intervention or any user interface being displayed.

Assisted Repair: A user can manually initiate a repair workflow. Information is displayed to the user with each step in the repair that is executed. The user may also opt to manually start each step in the repair workflow.

Configuration Management Database (CMDB): CMDB are external sources of configuration data about IT infrastructure.

Remote Action Service: Commands may be run on machines other than the one with the repair workflow execution engine. These remote action services present a web service interface that the execution engine can send commands to. Remote action services contain actions which are scripts or code snippets that perform some operations in a repair.

Figure 2:
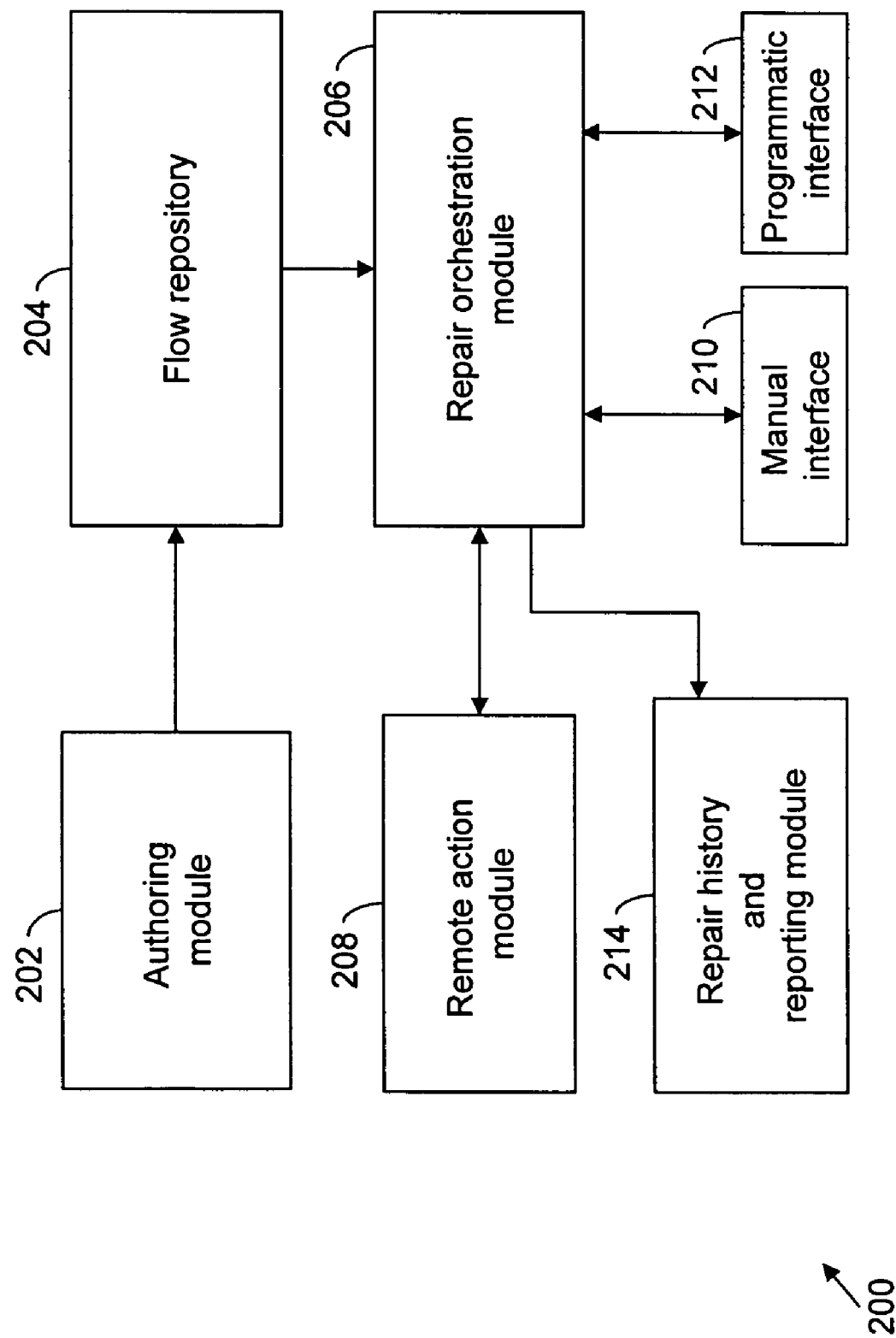
FIG. 2 is a block diagram of a system for automated and assisted resolution of IT incidents, in accordance with an embodiment of the invention.

FIG. 2 is a block diagram of a system 200 for automated and assisted resolution of IT incidents, in accordance with an embodiment of the present invention. System 200 includes an authoring module 202, a flow repository 204, a repair orchestration module 206, a remote action module 208, a manual interface 210, a programmatic interface 212, and a repair history and reporting module 214, operatively coupled to each other as shown. In various embodiments of the present invention, system 200 and its elements are implemented as software, hardware, firmware, and/or a combination thereof.

Repair workflows are created at authoring module 202. The repair workflows are created by the defining steps and connecting the steps with transitions. Defining the steps includes naming the steps and attaching operations to the steps. Connecting the steps to transitions includes naming the transitions, assigning a triggering response, and a destination step. Each response from the step's operation has a transition attached and the transition links the response of the operation to another step. The operation can have code attached to parse the output of the operation to determine the appropriate response. Gated transitions are used for providing security to the steps. Authoring module 202 also creates end points for the flow. In an embodiment of the present invention, the end points are ERROR, RESOLVED, DIAGNOSED, and NO ACTION TAKEN. Further, authoring module 202 creates a repair context and assigns variables to the repair context.

Flow repository 204 stores and manages the repair workflows. In an embodiment, the repair workflows are created by authoring module 202. The repair workflows are stored by creating a hierarchy of folders and assigning the repair workflows to the folders. Flow repository 204 is capable of naming, renaming, editing, exporting, importing, and deleting the repair workflows. Further, flow repository 204 enables client devices 106 to search for repair workflows by name, description, or other keywords within the repair. In an embodiment of the present invention, an interface for flow repository 204 is provided. The interface enables exploring the folders, subfolders, repair workflows, operations, and so forth, of flow repository 204. An exemplary embodiment of the interface is shown in conjunction with FIG. 6, which has been described in the subsequent paragraphs.

Repair orchestration module 206 executes the repair workflows. Execution of the repair workflows involves executing the code attached with the operations and transitions in the repair workflows. In an embodiment of the present invention, the execution of some of the operations in repair workflows is carried out at remote action module 208. The execution can either be fully automated or interactive. In fully automated execution, the repair workflows are executed without indicating the steps performed by a user at client devices 106. In the interactive execution of the repair workflows, the repair workflows are executed by indicating to the user at each step about the operations in the step. The user confirms the execution of each step in a repair workflow. Repair orchestration module 206 also maintains the record details of the execution of repair workflows.

Remote action module 208 provides remote actions that are parts of the repair workflows. The remote actions are scripts or code snippets that are executed on remote device 110. The scripts or code snippets perform operations in the repair workflows. In an embodiment of the present invention, the remote actions are frequently executed operations in the repair workflows, hosted on remote devices for load sharing. In another embodiment of the present invention, the remote actions are hosted on remote device 110 for providing repair workflows to client devices 106 that are geographically distributed.

In an embodiment of the present invention, remote action module 208 is a container for the remote actions that is detectable using Universal Description, Discovery and Integration (UDDI), Remote Procedure Call (RPC), and so forth. In another embodiment of the present invention, remote action module 208 supports query for remote action from client devices 106 and remote deployment. The support for query can be implemented by using an IAction interface. In yet another embodiment of the present invention, client devices 106 are capable of securely deploying new remote actions at remote action module 208. Secure deployment can be achieved by providing client devices 106 a shared key in order to access remote actions.

Manual interface 210 manually invokes repair workflows and guides the user through the interactive execution of the repair workflows. Invoking the repair workflows includes listing the repair workflows in flow repository 204, selecting a repair workflow and triggering the execution of the selected repair workflow. In an embodiment of the present invention, the interactive execution of the repair workflow involves displaying steps of the repair workflow, indicating a current step of the repair workflow, the current step being executed, and gathering the inputs and run context information for the current step. Further, the interactive execution of the repair workflow includes executing the operation attached to the steps and transitioning to the subsequent steps in the repair workflow. It also includes displaying execution data, such as, memory usage, status of infrastructure devices 104, percentage completion of repair workflow, and so forth. The interactive executions include storing the execution data in repair history and reporting module 214. Security for each of the steps of the repair workflow is also checked during the execution of the repair workflow. In an embodiment of the present invention, a repair interface is provided for interactive execution. An exemplary embodiment of the repair interface is shown in conjunction with FIG. 7.

Moreover, manual interface 210 provides an interface for searching a repair workflow in flow repository 204. In an embodiment of the present invention, manual interface 210 is a computer implemented web interface. The web interface allows the user to enter a string and search available flows for matches for that string. In an embodiment of the invention, the string is searched for matches in a brief documentation and keywords attached to each repair workflow. Further, the web interface displays the repair workflows in search result. The user can then choose to either execute the entire repair workflow or to execute the repair workflow interactively. An exemplary embodiment of the web interface is shown in conjunction with FIG. 8.

Programmatic interface 212 automatically invokes the execution of a repair workflow. In an embodiment of the present invention, the invoking is through Hyper Text Transfer Protocol (HTTP) based interfaces. The repair workflow to be executed is selected by using a unique identity. In an embodiment of the present invention, the unique identity is defined by using the location of the repair workflow in the hierarchy of folders of flow repository 204. In another embodiment of the present invention, the unique identity is defined by using a Universally Unique ID (UUID) that is attached to the repair flow. Further, the input and run context are passed on as parameters to the selected repair workflow.

Repair history and reporting module 214 stores the execution data. The execution data, by way of example, includes the results of each step, the infrastructure device of infrastructure devices 104 that was repaired, the number of repairs of each of infrastructure devices 104, and so forth. Repair history and reporting module 214 also provides reports related to various parameters in enterprise network 102. The various parameters, by way of example only, includes success rate of a repair workflow, average Mean Time To Repair (MTTR), the infrastructure device that failed most frequently, Return On Investment (ROI) for system 200, most frequently run repair workflows, and so forth. In an embodiment of the present invention, repair history and reporting module 214 provides a report and history interface. The report and history interface allows the user to select a particular repair workflow or set of repair workflows, and filter information by criteria such as date and time, the user that ran a repair workflow, whether the flow resolved the IT incident, and so forth. Further the report and history interface allow the user to see how many repair workflows met the appropriate criteria, what percentage resolved or diagnosed the IT incident, or were unable to complete, and MTTR that was achieved for that repair workflow. An exemplary embodiment of the report and history interface is shown in conjunction with FIG. 9.

Figure 3:
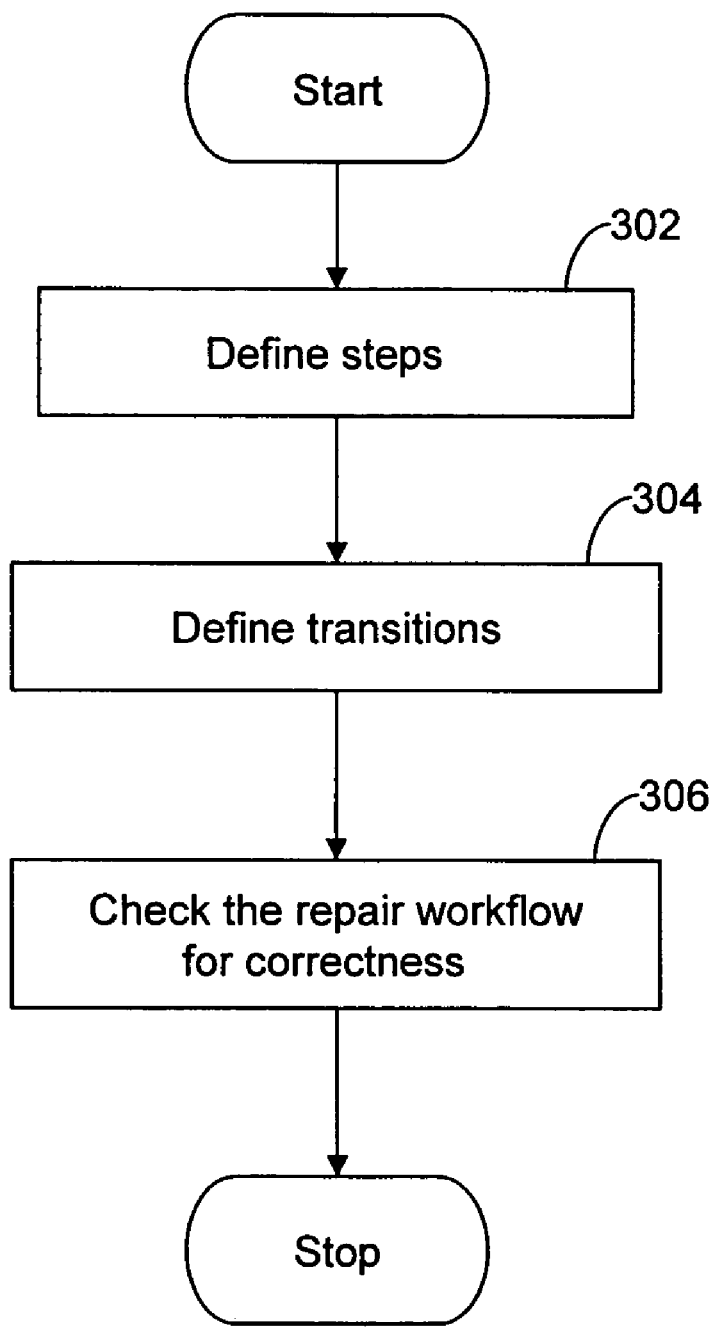
FIG. 3 is a flowchart of a method for defining a repair workflow, in accordance with an embodiment of the present invention.

FIG. 3 is a flowchart of a method for defining a repair workflow, in accordance with an embodiment of the present invention. At 302, steps are defined. Each step includes an operation, inputs for the operation, and output of the operation. Examples of operation include but are not restricted to checking the status of infrastructure devices 104, resetting infrastructure devices 104, pinging infrastructure devices 104, and so forth. Defining the steps includes naming the steps, selecting operations, assigning the inputs to bindings, and attaching transitions to responses for the operations. In an embodiment of the present invention, the operations are selected from predefined operations. In another embodiment of the invention, new operations are created and then selected.

In various embodiments of the present invention, the inputs to the operations are predefined data values that are provided by the user at client device 106a, data values from the run context, contents of files, values from directory services, values from CMDB, and so forth. In an embodiment of the present invention, the inputs are bound to the operations using input bindings. Further, at 302, executable codes for the operations are attached to the defined steps.

At 304, transitions are defined. These transitions link the steps to generate the repair workflow. A transition links a response of a step's operation to another step. For example, the step's operation has the responses TRUE and FALSE. A transition 'TRUE' links the step to another step. A transition 'FALSE' links the step to a different step. Defining the transitions includes assigning it to a triggering operation response and to a destination step. Responses are recognized by parsing the output of the operation.

After linking the steps with the transitions, at 306, the repair workflow is checked for correctness. The check verifies that the repair workflow includes only one start step, and that each response defined in the operations for the steps has transitions to another step. Further, at 306, the check verifies that the inputs defined for the operations in the steps have the input bindings.

After the repair workflow is checked for correctness, it is stored. In an embodiment of the present invention, the repair workflow is stored in flow repository 204.

In an embodiment of the present invention, the method for defining a repair workflow is implemented by using a graphical application. The graphical application includes a canvas and a palette of objects. The canvas visually represents the repair workflow, including each step, name of the step, transition, names of transition, and so forth. In an embodiment of the present invention, the canvas is a standard drag and drop canvas. Color-coding and shape-coding can be used in the canvas to differentiate between different steps and transitions. The palette of objects includes operations and existing repair workflows that may be used as subflows. In an embodiment of the present invention, the palette has the ability to access flow repository 204. Further, the palette is capable of displaying expanded and collapsed hierarchy of folders of flow repository 204. The user at client devices 106 uses the graphical application to create repair workflows. The created repair workflows are stored in flow repository 204. An exemplary embodiment of the graphical application is shown in conjunction with FIG. 10.

Figure 4:
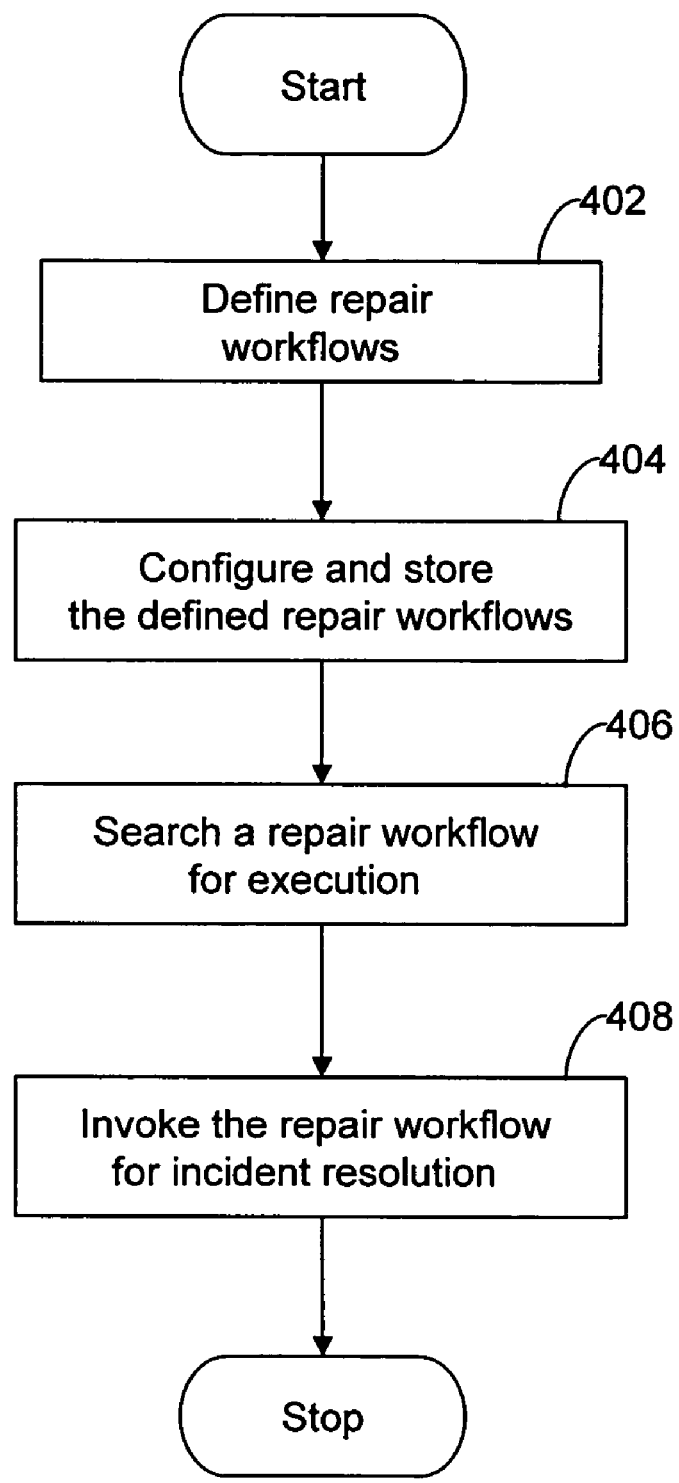
FIG. 4 is a flowchart of a method for resolving an IT incident, in accordance with an embodiment of the present invention.

FIG. 4 is a flowchart of a method for resolving an IT incident, in accordance with an embodiment of the present invention. At 402, repair workflows are defined by using authoring module 202. In an embodiment of the present invention, authoring module 202 uses the graphical application for defining the repair workflow. At 404, defined repair workflow are configured and stored in flow repository 204. The configuration of the defined workflow includes configuring the context and properties of the defined repair workflows. Flow repository 204 creates a hierarchal structure of folders that includes subfolders, operations, and the repair workflows. In an embodiment of the present invention, storage of the repair workflows is achieved by using the graphical application. The storage is achieved by creating new folders, subfolders and assigning the repair workflows to the folders. In another embodiment of the present invention, the graphical application is capable of deleting repair workflows, and renaming repair workflows, exporting and importing the repair workflows. In yet another embodiment of the present invention, the repair workflows are stored in Extensible Markup Language (XML) format, so that the repair workflows are transformable into alternative outputs such as run books, knowledge bases and so forth, by Extensible Stylesheet Language Transformation (XSLT) tools.

At 406, a repair workflow is searched for execution. The repair workflow is capable of resolving the IT incident. In an embodiment of the present invention, the repair workflow is searched using manual interface 210. Thereafter, at 408, the searched repair workflow is invoked for resolution of the IT incident. Invoking the searched repair workflow is followed by execution of the searched repair workflow which is described in the text below.

Figure 5A:
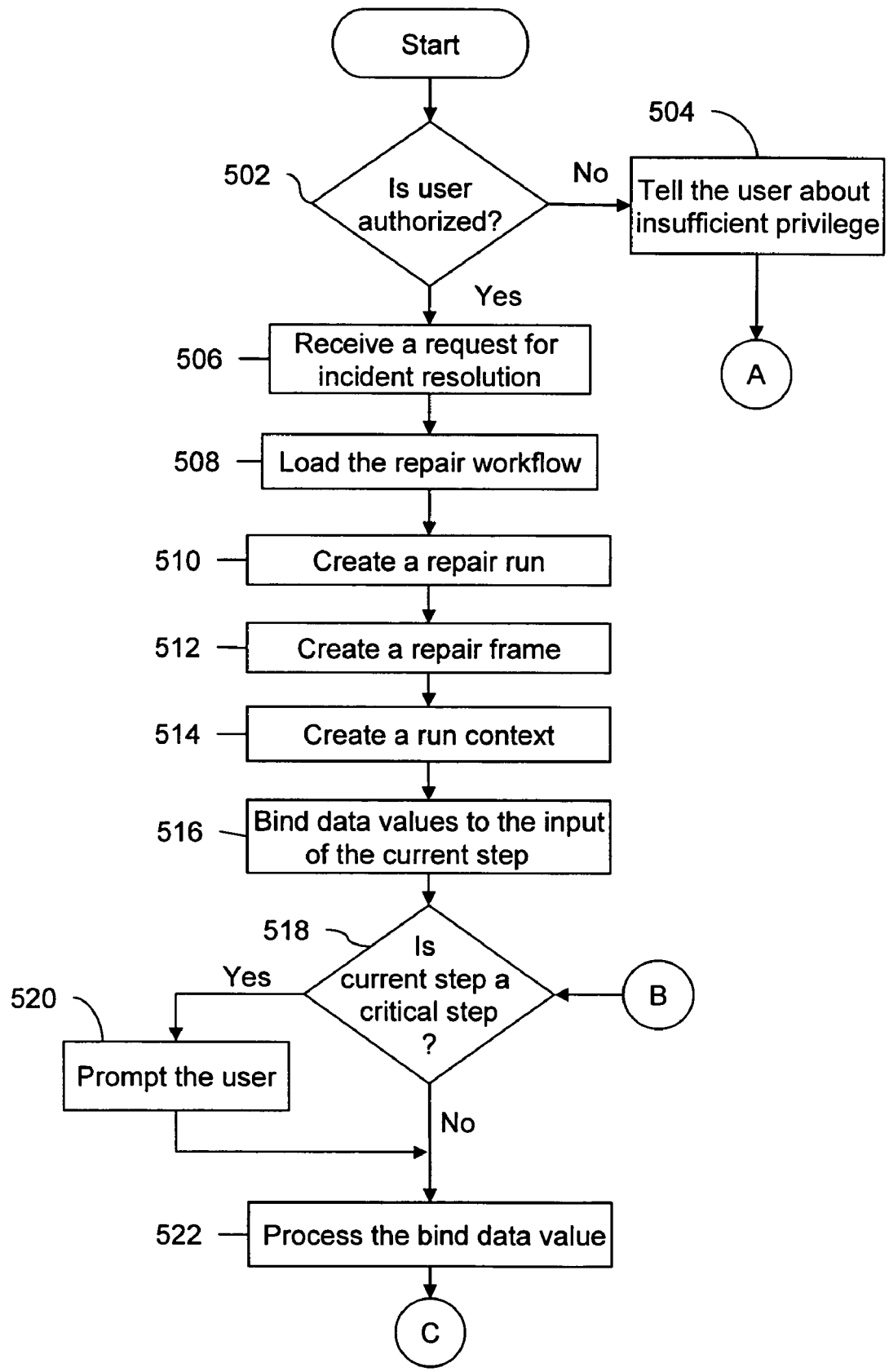
FIG. 5 is a flowchart of a method for resolving an IT incident, in accordance with another embodiment of the present invention.
Figure 5B:
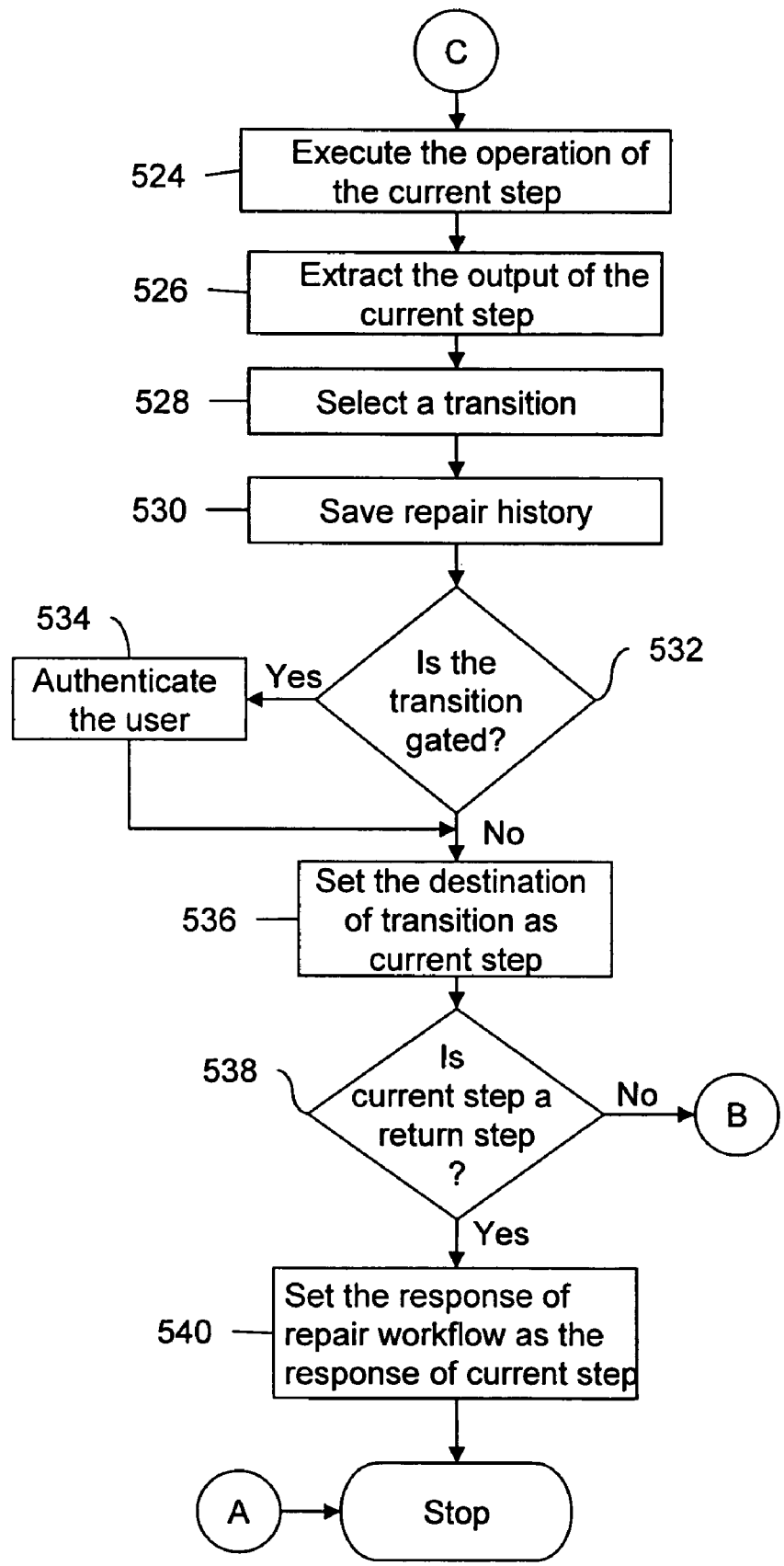
Figure 11:
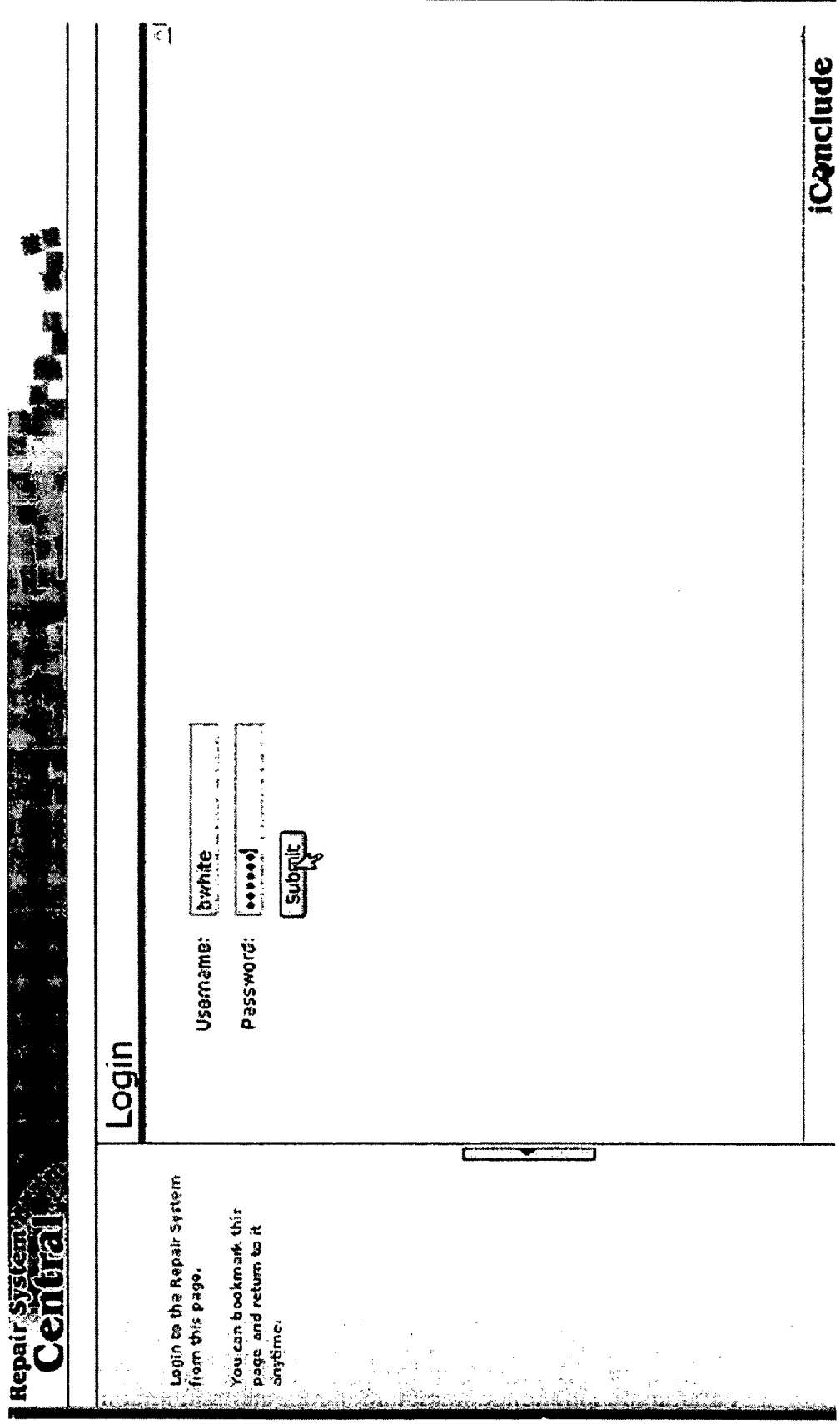
FIG. 11 illustrates a view of a login interface for authenticating a user for the resolution of an IT incident, in accordance with an embodiment of the present invention.
Figure 12:
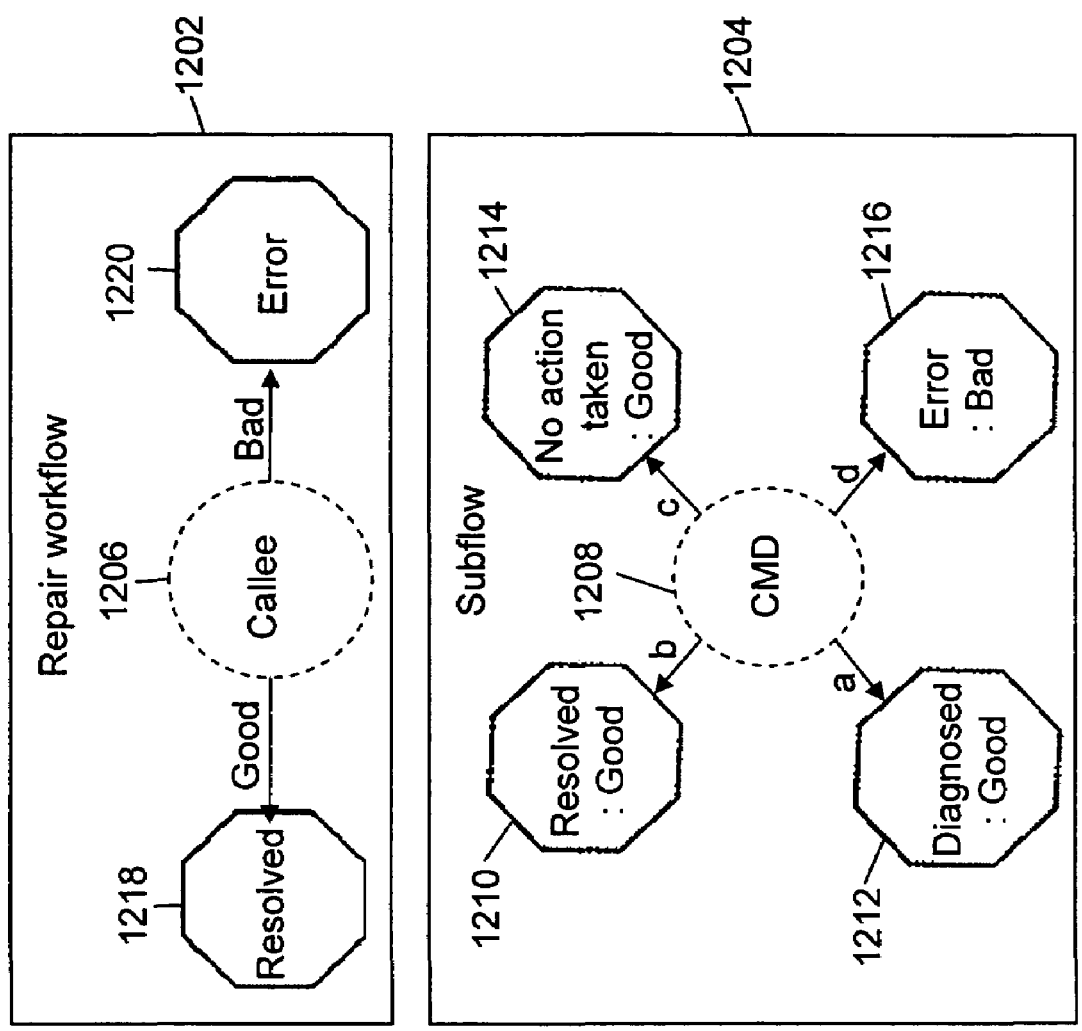
FIG. 12 illustrates the relationship between a flow and a subflow.

FIG. 5 is a flowchart of a method for resolving an IT incident, in accordance with another embodiment of the present invention. At 502, a condition is checked to verify that the user at client device 106a is authorized to execute the repair workflow. In an embodiment of the present invention, a login interface is provided and the user is authenticated on providing correct 'username' and 'password'. An exemplary embodiment of the login interface is shown in FIG. 11. If the user is not authorized to execute the repair workflow, then, at 504, the user is informed about insufficient privilege. However, if at 502, the user is identified as an authorized user, at step 506, a request is received for resolution of the IT incident. In an embodiment of the present invention, the request is received at repair orchestration module 206. A repair workflow capable of resolving the IT incident is selected from flow repository 204. At 508, the repair workflow is loaded into a memory at repair orchestration module 206. A repair run for the repair workflow is created at 510. In an embodiment of the present invention, creation of the repair run involves initiating the execution of the repair workflow. At 512, a repair frame is created for execution of the repair workflow. In an embodiment of the present invention, the repair frame defines the scope of the operations, variables associated with the repair workflow. In an embodiment of the present invention, the repair workflow can contain subflows. During the execution of the repair workflow a stack of repair frames is created and the flow of control steps 'into' and 'out' of the subflow repair frames. After creating the repair frame, at 514, a run context for the repair frame is created. The run context is populated with information about the infrastructure devices 104 and enterprise network 102. In an embodiment of the present invention, the information is obtained from a Configuration Management Database (CMDB). In another embodiment of the present invention, discovery methods are used for obtaining the information. Examples of the discovery method include, but are not limited to, Universal Description, Discovery, and Integration (UDDI), Remote Procedure Call (RPC), and so forth. After populating the run context, a current step is defined. In an embodiment of the present invention, the current step is the start step of the repair workflow. At 516, data values are bound to the inputs of the current step. In an embodiment of the present invention, binding of the data values is achieved by using bindings for the current step. Thereafter, at 518, a condition is verified to identify that the current step is a critical step. A critical step is a step that requires verification from the user. Examples of the critical step include, but are not limited to, shutting down one of infrastructure devices 104, disconnecting infrastructure devices 104, restarting infrastructure devices 104, and so forth. If the current step is critical, then at 520, the user is prompted. In an embodiment of the present invention, a dialog box is displayed to prompt the user. However, if the current step is not critical, the data values bound to the inputs of the current step are processed at 522. In an embodiment of the present invention, processing the data values includes prompting the user to provide data values if the data values are bound using user input bindings. Thereafter, at 524, an operation of the current step is executed. Executing the operation includes checking that the inputs to the operation are bound to the data values and executing the executable codes attached to the operation. The operation can be a local action, a remote action or a subflow. In an embodiment of the present invention, the operation is a local action, the local action is executed on the repair orchestration module 206 and the results are returned to the repair workflow. In another embodiment of the present invention where the operation is a remote action, a request is sent to the remote action module 208, to execute the remote action. The response of execution of the remote action is read and translated into operation results and returned to the repair workflow. In yet another embodiment of the present invention where the operation is a subflow, a subflow repair frame is created for the subflow and the current step in the subflow repair frame is set to the start step of the repair workflow. The response of the operation is set as the response of the return step of the subflow. The relationship between a repair workflow and the subflow is illustrated in FIG. 12. After executing the operation of the current step, at 526, the output of the current step is extracted. The output is the result of the operation. At 528, a transition is selected. The selection of transition includes extracting the response of the operation and finding a transition that matches the operation response. At 530, repair history information of the current step is stored in repair history and reporting module 214. In an embodiment of the present invention, storing the repair history information of the current step includes storing the following: the result for the current step, the response generated infrastructure device that was repaired, and ROI.

After storing the repair history information of the current step, at 532, a condition is checked to verify whether the transition selected at 528 is a gated transition. If the transition selected at 528 is a gated transition, the user is authenticated at 534. In an embodiment of the present invention, authenticating the user includes identifying that the user has a predefined privileged. If the user has the predefined privilege, the method proceeds to 536. However, if the user does not have predefined privilege, the user is prompted to hand off the execution to another user with predefined privilege. In an embodiment of the present invention, the predefined privilege is provided to a set of users in enterprise network 102. If, 532, the transition selected at 528 is not a gated transition, the current step is set to the destination of the transition at 536. Thereafter, at 538, a condition is checked to verify that the current step is a return step. If the current step is the return step, at 540, the response of the repair workflow is set to the response of the current step. However, if at 538, the current step is not a return step, then the execution is transferred to 518, to verify that the current step is a critical step.

Figure 6:
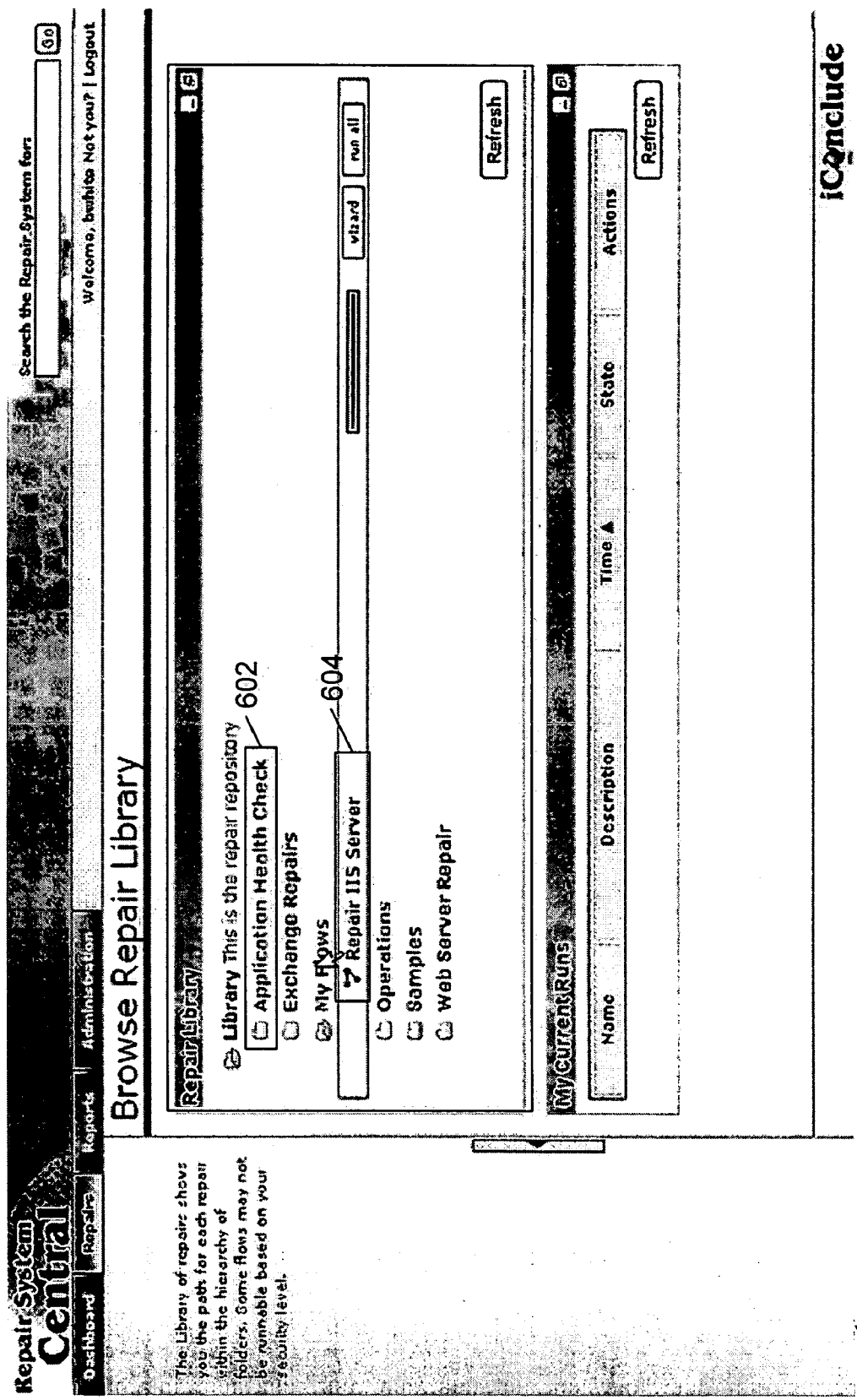
FIG. 6 is a view of an interface for a flow repository, in accordance with an embodiment of the present invention.

FIG. 6 is a view of an interface 600 for flow repository 204, in accordance with an embodiment of the present invention. Interface 600 provides the user with the capability to visually explore the hierarchy of folders of flow repository 204. A folder 602 and a repair workflow 604 are also shown in the view.

FIG. 7 is a collection of views of a repair interface for interactive execution of a repair workflow, in accordance with an embodiment of the present invention. FIG. 7a shows the view of the repair workflow before the execution of the repair workflow starts. In this view, 702 highlights all the steps and transitions. In addition, 704 illustrates the part of the view that provides a brief description of the repair workflow.

Figure 7A:
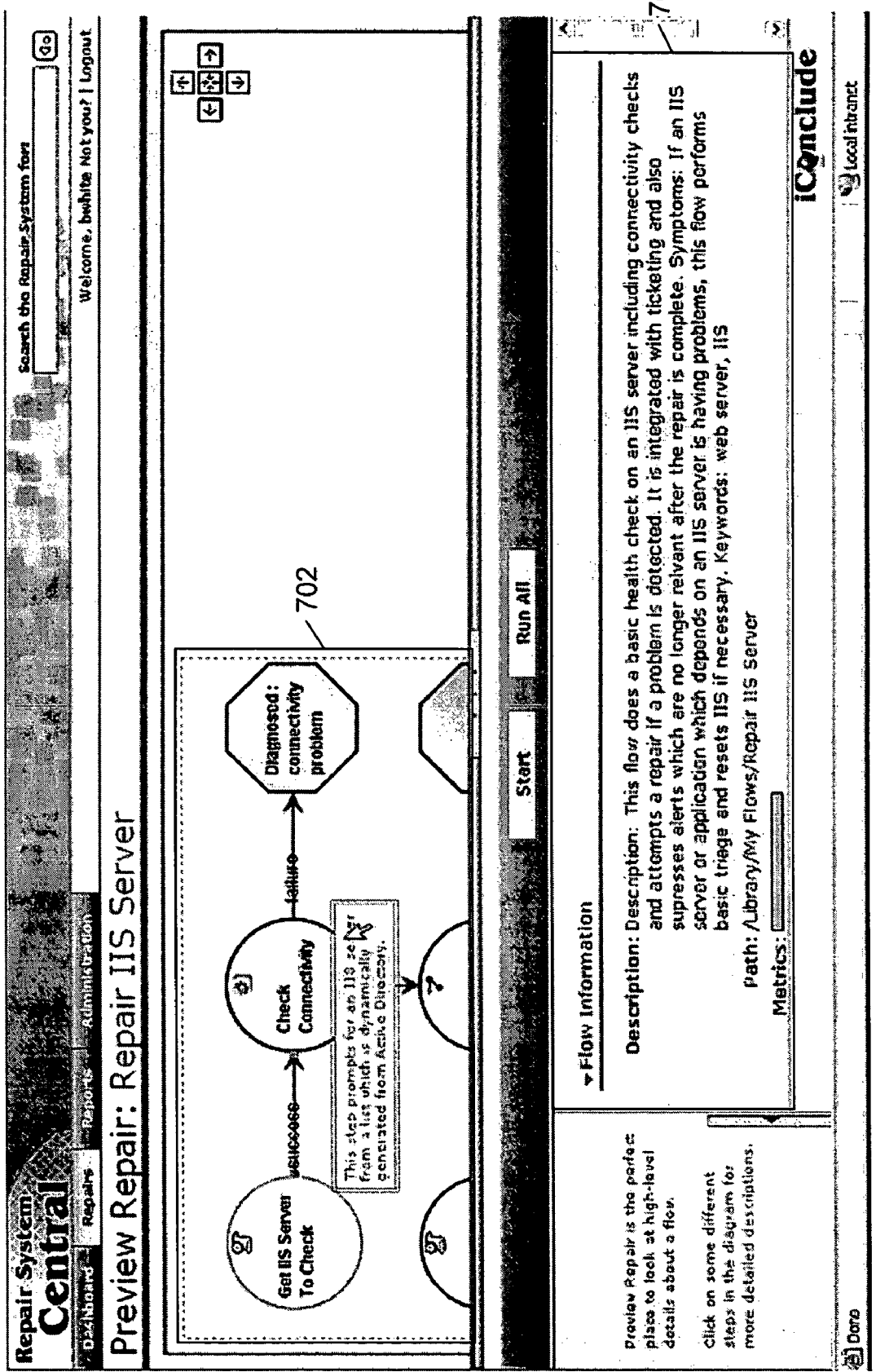
FIG. 7 is a collection of views of a repair interface for interactive execution of a repair workflow, in accordance with an embodiment of the present invention.
Figure 7B:
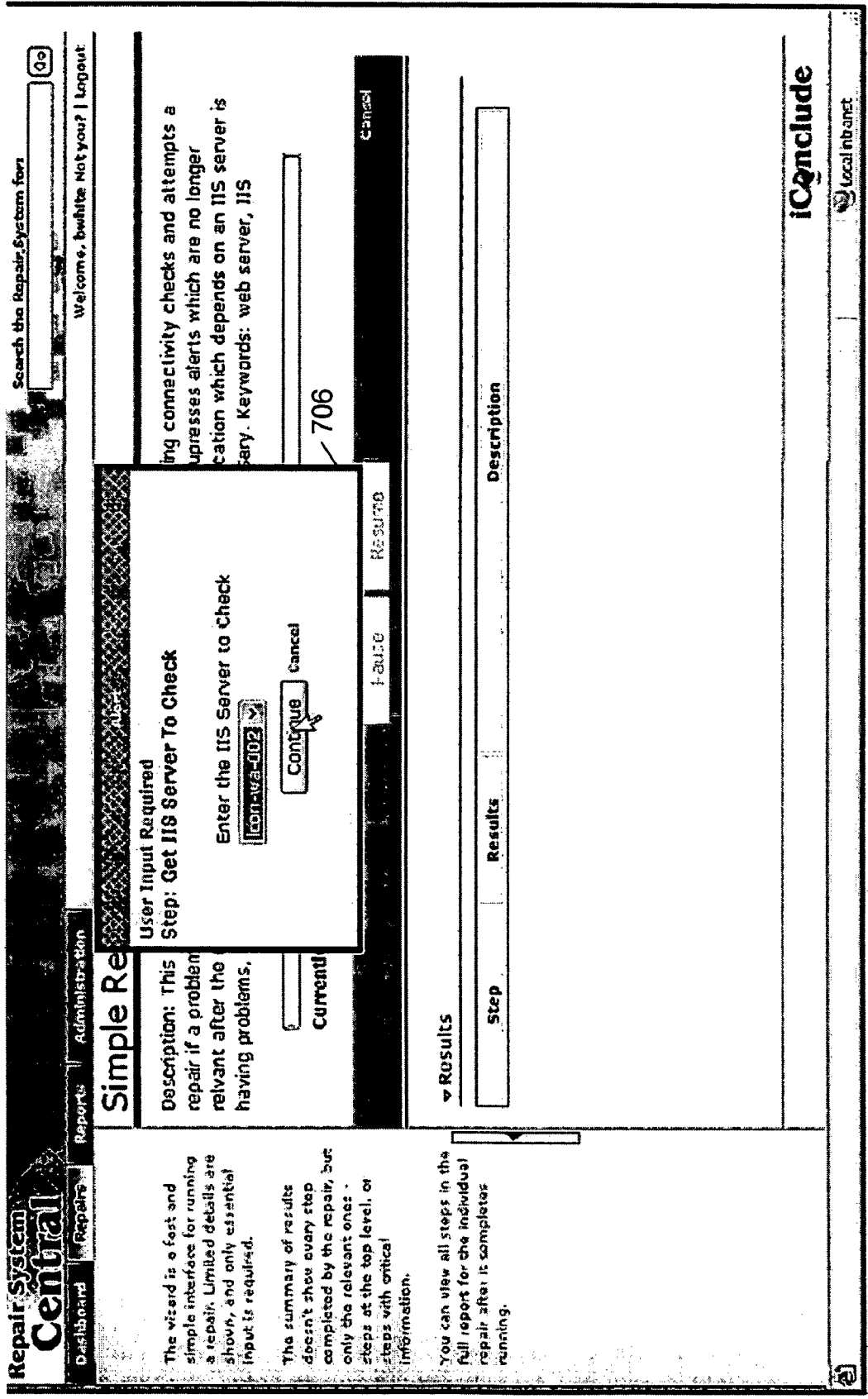

FIG. 7b illustrates the execution of the repair workflow where a user input binding is encountered, and the user is prompted to provide an input value. 706 is a dialog box that prompts the user for input.

Figure 7C:
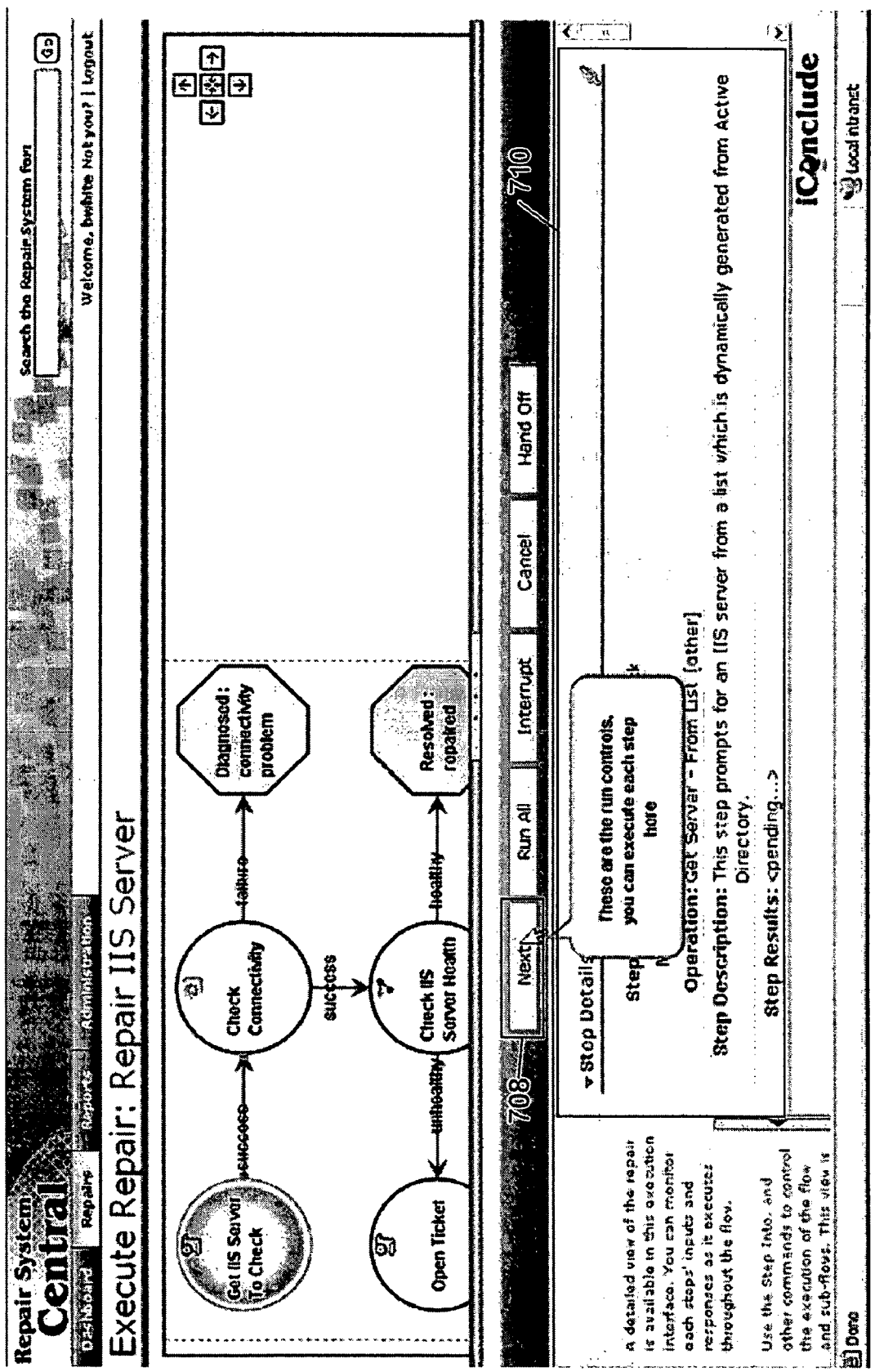

FIG. 7c illustrates the view of the repair workflow where a step has been completed and the user has to click on a button 708 to go to the next step. Moreover, 710 illustrates a description of the step that is already completed.

Figure 7D:
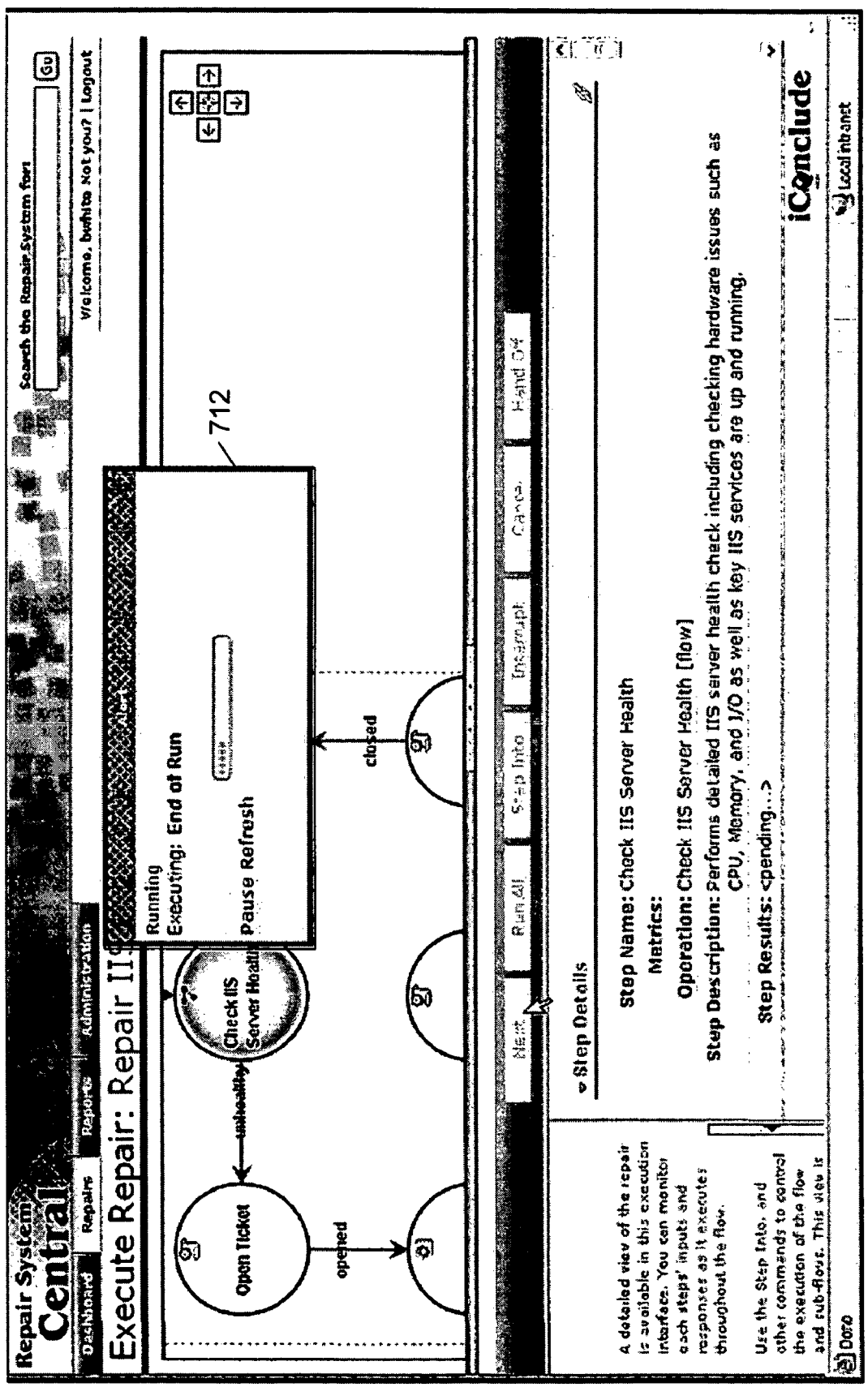

FIG. 7d illustrates a view of the repair workflow where all the steps have been executed and an alert 712 is generated. Alert 712 indicates to the user that the end of the execution is in progress.

FIG. 7e illustrates a view of the repair workflow, after the execution is complete. A result of every step along with a description is displayed in 714 in a report form.

Figure 8:
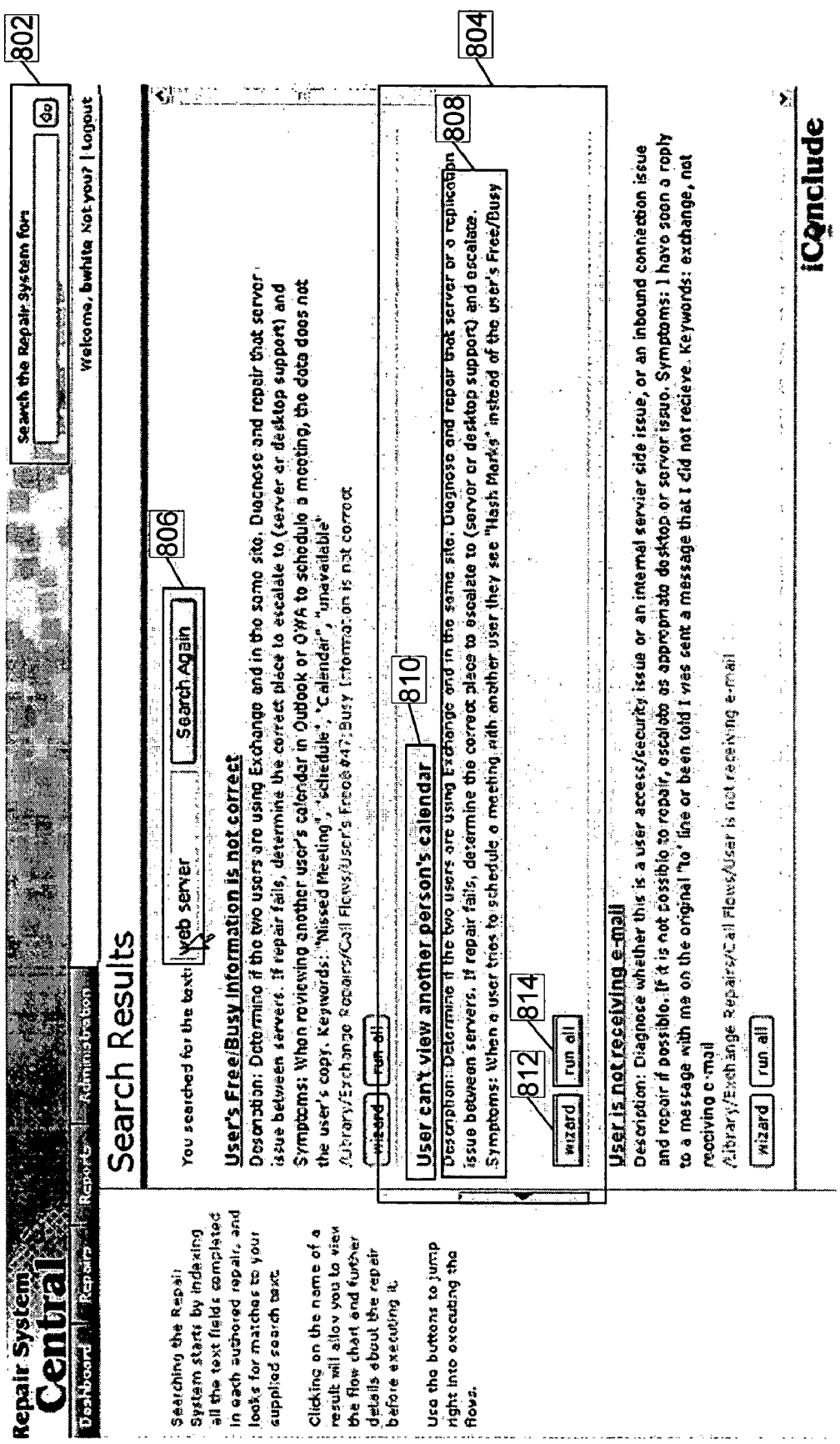
FIG. 8 illustrates a view of a web interface for searching a flow repository in accordance with an embodiment of the present invention.

FIG. 8 illustrates a view of a web interface for searching flow repository 204 in accordance with an embodiment of the present invention. Web interface 800 includes a search box 802, a search result 804, and a filter box 806. Search result 804 further includes a description 808, a title 810, a wizard-run button 812 and a run-all button 814. Search box 802 facilitates the searching of a repair workflow using a string that is entered into the text field of search box 802. Repair workflows appear as search results once the search string is searched for matches. Filter box 806 is used to refine the search results. The search string is matched with the keywords in description 808, and title 810 of the repair workflows. Clicking wizard-run button 812 initiates the interactive execution of a resulting repair workflow, the interactive execution is described in the text above. Clicking run-all button 814 executes the resulting repair workflow without any manual interaction.

Figure 9A:
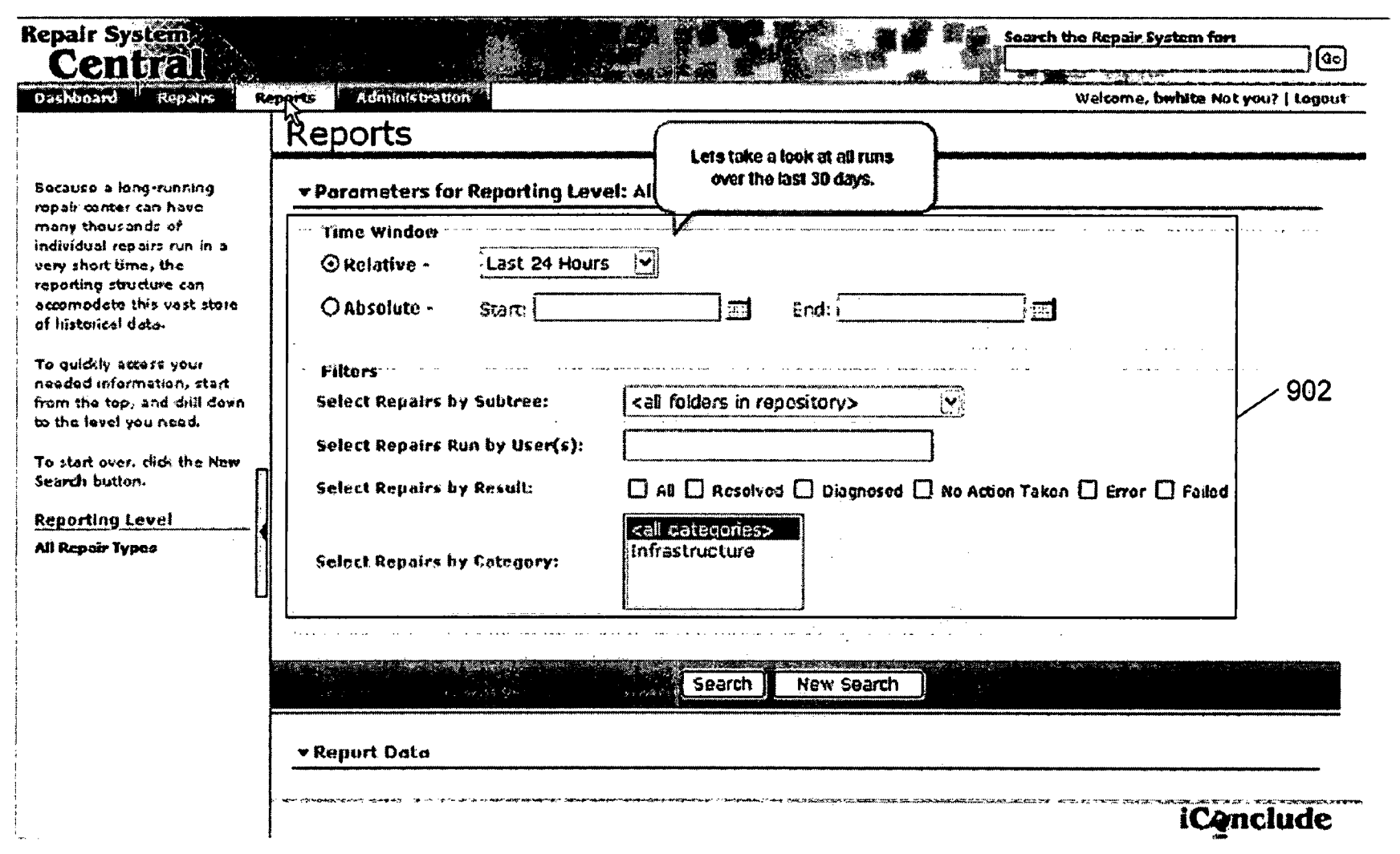

FIG. 9 illustrates views of the report and history interface for repair history and reporting module 214, in accordance with an embodiment of the present invention. FIG. 9a illustrates a view of the report and history interface with various criteria for filtering the information in repair history and reporting module 214. These various criteria have been highlighted by a box 902. A user selects values for the various filters and generates a report 904. FIG. 9b illustrates the report 904 generated by the user.

Figure 10A:
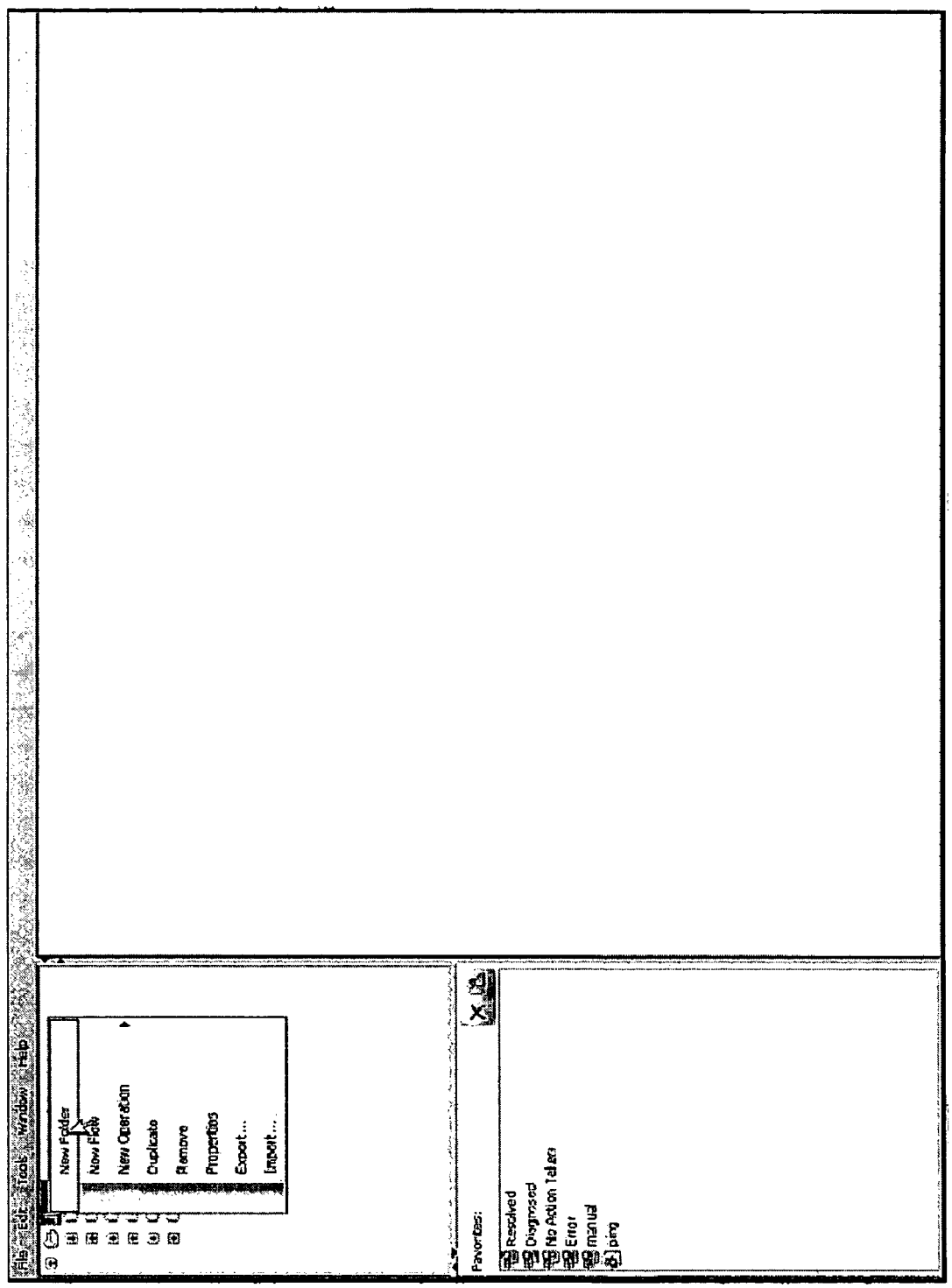
FIG. 10 illustrates views of a graphical application for defining repair workflows for an IT incident resolution, in accordance with an embodiment of the present invention.
Figure 10B:
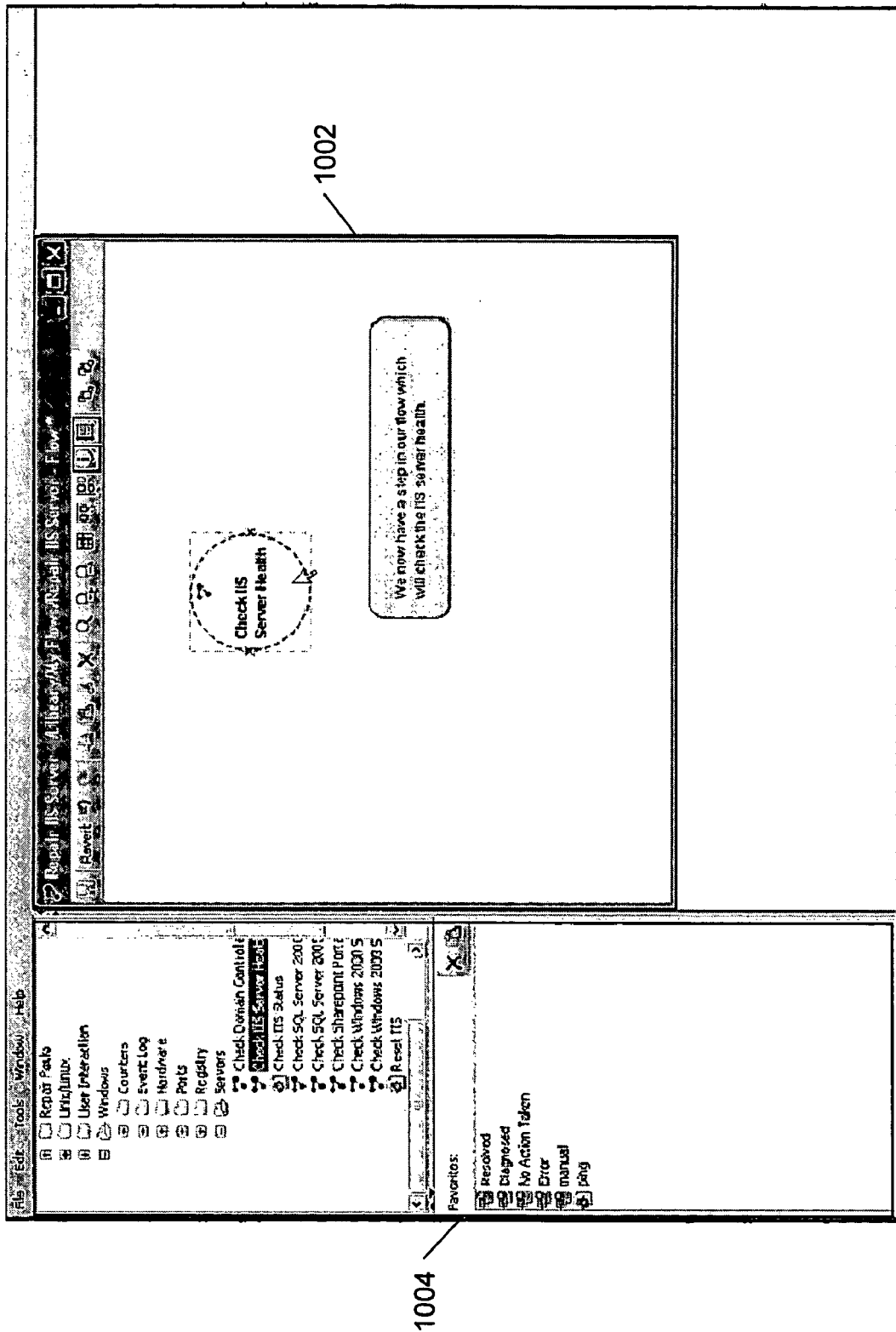
Figure 10C:
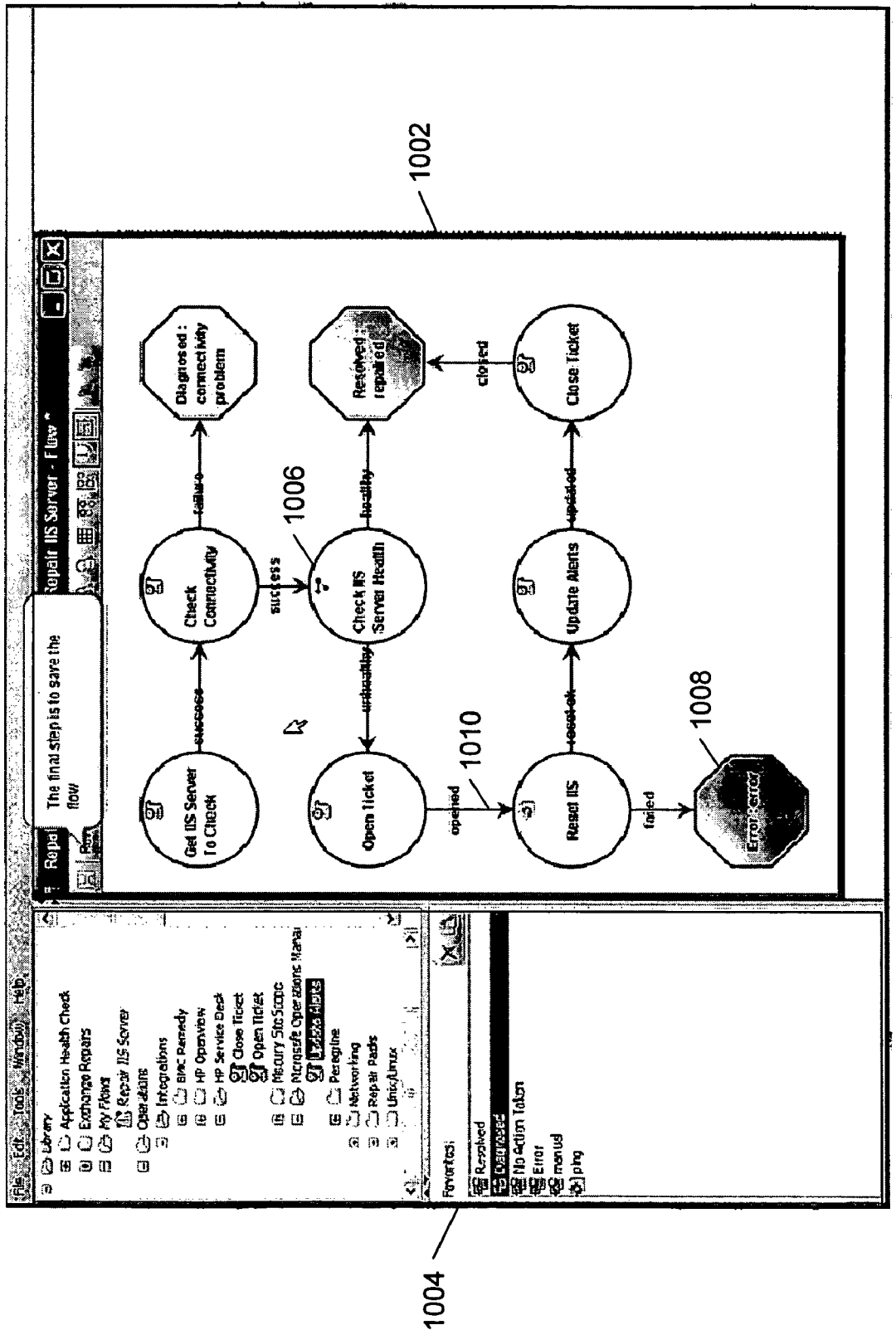

FIG. 10 illustrates views of the graphical application for defining repair workflows for IT incident resolution, in accordance with an embodiment of the present invention. FIG. 10a is a view of the graphical application when a new repair workflow is created by creating a new folder for a new repair workflow. FIG. 10b illustrates a canvas 1002 with a step that is dragged and dropped into canvas 1002 from a palette 1004. Palette 1002 illustrates the expanded view of the hierarchy of folders in flow repository 204. FIG. 10c illustrates the complete repair workflow created by dragging and dropping the steps into canvas 1002 and connecting the various steps by using transitions. Circular blocks 1006 represent the steps involved. Octagonal blocks, such as octagonal block 1008, represent the end points. Transitions are represented by arrows, such as 1010 with text attached to them. The graphical application also provides the user capability to save the created repair workflow.

FIG. 11 illustrates a view of the login interface for authenticating a user for resolution of an IT incident, in accordance with an embodiment of the present invention. As shown in FIG. 11, a username and a password are provided for authenticating the user.

FIG. 12 illustrates the relationship between a repair workflow 1202 and a subflow 1204. 1206 is a step in repair workflow 1202 that has an operation that is subflow 1204. 1206 is a step in subflow 1204 which has four transitions (a, b, c, and d). Terminating steps 1210, 1212, and 1214 return a response of 'Good' to repair workflow 1202. Based on terminating steps 1210, 1212, and 1214, repair workflow 1202 will transition to 'Resolved' at terminating step 1218 of subflow 1204. Terminating step 1216 of subflow 1204 returns a response of 'Bad'. Based on this response repair workflow 1202 will transition to 'Error' at terminating step 1220 of repair workflow 1202.

The various embodiments of the present invention enable the user to define repair workflows for IT incident resolution in any enterprise. The defined repair workflows are stored in the flow repository that makes the defined repair workflow available to any other user or application in the enterprise. Further, in an embodiment of the present invention, a graphical application is provided for visually defining the repair workflow. The ability to define the repair workflow makes the embodiments of the present invention adaptable to any enterprise and reduces the instances of unresolved IT incidents. Additionally, the various embodiments of the present invention enable the user to resolve an IT incident. The user can choose to resolve the IT incident interactively or automatically. Various embodiments of the present invention also enable the user to save, and manage the repair workflows. Further, various embodiments of the present invention, authenticate the users at various levels of execution of repair workflow and define repair workflow. In an embodiment of the present invention, a web interface is provided so that multiple users can run repair workflows for IT incident resolution in the enterprise.

The system, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the operations that constitute the method of the present invention.

The computer system comprises a computer, an input device, a display unit and the Internet. Computer comprises a microprocessor. Microprocessor is connected to a communication bus. Computer also includes a memory. Memory may include Random Access Memory (RAM) and Read Only Memory (ROM). Computer system further comprises storage device. It can be a hard disk drive or a removable storage drive such as a floppy disk drive, optical disk drive and the like. Storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

While the illustrative embodiments of the invention have been described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A computer implemented method for resolving an information technology (IT) incident, comprising:

loading a repair workflow having a plurality of steps and transitions between the steps, defined to repair the IT incident on a computing device, each of the steps having one or more inputs, processing logic for the input(s) and one or more outputs;

creating a repair frame for the loaded repair workflow on the computing device;

creating a repair context for the repair frame on the computing device, and populating the repair frame with configuration data;

binding one or more data values to the one or more inputs of one of the steps within the repair context;

processing the bound data values of the one or more inputs of the step within the repair context;

executing the step's operation;

extracting the one or more outputs of step within the context; and selecting a transition to transition to another step within the context, based at least in part on the extracted one or more outputs.

2. The method of claim 1, further comprising creating a repair run for said loading of the repair workflow.

3. The method of claim 2, further comprising receiving from a requestor a request to resolve an IT incident, determining whether the user has requestor has requisite authority to make the request, and rejecting the request if the requestor is determined not to have the requisite authority to make the request.

4. The method of claim 1, further comprising moving the step to the selected transition's destination, determining whether the selected transition's destination is a return step, and if so, select a response of the return step as a response of the repair workflow.

5. The method of claim 4, further comprising storing a record of the processing of the step in a repair history log.

6. The method of claim 1, wherein the requestor is a selected one of a user and a program.

7. An apparatus comprising:

a storage medium having a plurality of programming instructions stored in the storage medium, and adapted to enable the apparatus to perform a method; and one or more processors coupled to the storage medium to execute the programming instructions;

wherein the method comprises:

loading a repair workflow having a plurality of steps and transitions between the steps, defined to repair the IT incident on a computing device, each of the steps having one or more inputs, processing logic for the input(s) and one or more outputs;

creating a repair frame for the loaded repair workflow on the computing device;

creating a repair context for the repair frame on the computing device, and populating the repair frame with configuration data;

binding one or more data values to the one or more inputs of one of the steps within the repair context;

processing the bound data values of the one or more inputs of the step within the repair context;

executing the step's operation;

extracting the one or more outputs of step within the context; and selecting a transition to transition to another step within the context, based at least in part on the extracted one or more outputs.

* * * * *